United States Patent [19]
Fishman et al.

[11] Patent Number: 6,148,019
[45] Date of Patent: Nov. 14, 2000

[54] MODULAR HIGH POWER INDUCTION HEATING AND MELTING SYSTEM

[75] Inventors: Oleg S. Fishman, Maple Glen, Pa.; John H. Mortimer, Medford, N.J.

[73] Assignee: Inductotherm Corp., Rancocas, N.J.

[21] Appl. No.: 09/418,884

[22] Filed: Oct. 15, 1999

Related U.S. Application Data

[60] Provisional application No. 60/133,308, May 10, 1999.

[51] Int. Cl.$^7$ ........................................... H05B 6/06
[52] U.S. Cl. ........................ 373/147; 219/661; 373/149
[58] Field of Search ......................... 373/147, 148, 373/149, 150, 138; 219/663, 662, 665, 666, 661

[56] References Cited

U.S. PATENT DOCUMENTS

| | | | |
|---|---|---|---|
| 2,451,518 | 10/1948 | Strickland, Jr. | 373/147 |
| 4,403,327 | 9/1983 | Granstrom et al. | 373/147 |
| 5,272,719 | 12/1993 | Cartlidge et al. | 373/138 |
| 5,508,497 | 4/1996 | Fabianowski et al. | 219/663 |
| 5,666,377 | 9/1997 | Havas et al. | 373/147 |

OTHER PUBLICATIONS

John H. Mortimer, P.E., *Tomorrow's Induction Melt Shop Technologies Today*, Foundry Management & Technology, Mar. 1999, pp. 14–16, 19, and 20.

John H. Mortimer, P.E., *Tomorrow's Induction Melt Shop Technologies Today*, Foundry Management & Technology, May 1999, pp. 41, 44, 46, 48 and 50.

*Primary Examiner*—Tu Ba Hoang
*Attorney, Agent, or Firm*—Seidel, Gonda, Lavorgna & Monaco, PC

[57] ABSTRACT

A system for melting metal and holding molten metal, comprises a rectifier unit receiving AC electric power and outputting DC electric power, a plurality of inverter units, each receiving the DC electric power output by the rectifier unit and outputting AC electric power; and a plurality of induction furnaces each receiving the electric power output by a respective inverter unit. Each inverter unit comprises a plurality of inverter modules connected in parallel, each module independently being connectable to and disconnectable from the rectifier unit and the furnace. The rectifier unit comprises a plurality of rectifier modules connected in parallel, each module independently being connectable to and disconnectable from the AC supply and the inverter units. The total power output of the rectifier unit is more than the sum of the powers required by all of the furnaces when they are holding a charge of molten metal, but less than the sum of the maximum powers required by each furnace when melting a charge of metal. If the total power demand is greater than the rectifier can supply, the power supply is reduced to those furnaces that are receiving more than the holding power.

19 Claims, 7 Drawing Sheets

MODULAR HIGH POWER INDUCTION HEATING AND MELTING SYSTEM

This application claims the benefit of U.S. Provisional Ser. No. 60/133,308 filed May 10, 1999.

FIELD OF THE INVENTION

The invention relates to induction furnaces, and especially to an improved power supply system for large systems using induction furnaces for the melting and heating of metals.

BACKGROUND OF THE INVENTION

Induction melting systems have gained in popularity in the production of metal cast parts, because they provide an efficient and clean way to heat and melt metals. In an induction furnace, a metal charge is placed inside, or immediately adjacent to, an induction coil. Electric power is supplied to the induction coil, and heats the metal by means of the electromagnetic field produced by the coil. Modern induction melting systems include an induction furnace supplied with power through a solid state power converter. The solid state power converter converts three-phase standard-frequency (50 or 60 Hz) power, from a public power utility's distribution line or the like, into single-phase variable-frequency current applied to the coil. The converter adjusts the variable frequency to match the inductive impedance of the coil with the capacitive impedance of the power supply to deliver optimum power to the metal charge inside the furnace.

Advances in power semiconductor devices have made it possible to build larger static solid state converters capable of providing megawatt level power. This facilitates production rates of tens to hundreds of tons of molten metal per hour.

The increase in size of induction melting systems poses two major requirements—continuous uninterrupted supply of molten metal "on-spec" from the melt shop to the cast shop and high reliability of the melting system. U.S. Pat. No. 5,272,719 describes a dual output converter that allows a single transformer/rectifier unit to deliver power to two furnaces simultaneously and allows the power to be shifted smoothly between the two furnaces.

This concept may be further expanded to allow the use of a plurality of inverter units, each supplying a separate furnace, with one rectifier unit. A large melt shop may require production of 100 tons of molten metal each hour consuming about 50 megawatts. To assure a constant and steady supply of metal, the system may consist of a transformer/rectifier unit capable of converting 50 megawatts from AC line to DC and three 24-megawatt inverters each connected to a 35 ton furnace. With such an arrangement, full power melting can be conducted in two furnaces simultaneously, consuming 48 megawatts, while 2 megawatts can be applied to maintain the temperature in the third furnace which is in the process of dispensing hot molten metal.

SUMMARY OF THE INVENTION

In accordance with the present invention, system reliability is achieved via modular design of the transformer/rectifier units and/or of the inverter units. Each unit may consist of several self-contained modules.

According to one aspect of the invention, there is provided a system for melting metal and holding molten metal. The system comprises a rectifier unit receiving AC electric power and outputting DC electric power; one or more inverter units, all receiving the DC electric power output from the rectifier unit and each outputting AC electric power; and one or more induction furnaces each receiving the electric power output from a respective one of the inverter units. Each inverter unit preferably comprises a plurality of inverter modules connected in parallel, each said module independently being connectable to and disconnectable from the rectifier unit and the respective furnace. Instead, or in addition, the said rectifier unit preferably comprises a plurality of rectifier modules connected in parallel, each said module independently being connectable to and disconnectable from the power supply and the rectifier units.

Each rectifier module may comprise a transformer and a rectifier to rectify the output from the transformer. At least some of the transformers are then preferably equipped to shift the phase of AC power while transforming it; and the transformers in different said rectifier modules then preferably shift the phase of the AC power supply by different amounts.

Each rectifier or inverter module may have a controller, with the controllers communicating via a network, and when a problem affects one module, the respective controller may then disconnect that module and notify the controllers of other modules of the same unit over the network.

When the said other controllers are notified that one module has been disconnected, they may shut down the remaining modules one after another. Instead, when one module is disconnected the remaining modules may continue to supply power at a reduced total capacity.

DETAILED DESCRIPTION OF THE INVENTION

Figure 1:
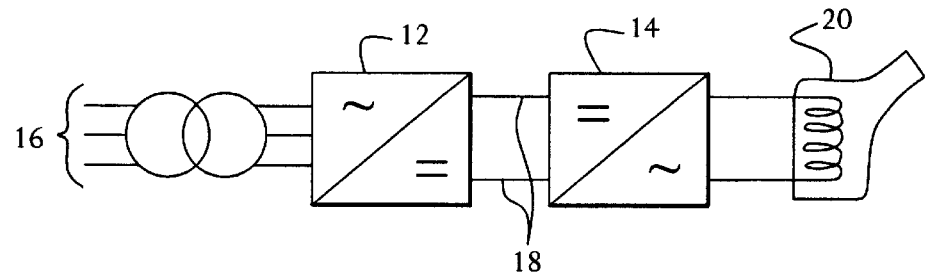
FIG. 1 is a block diagram of a conventional induction melting system.

Referring to FIG. 1 of the accompanying drawings, one conventional form of an induction melting system comprises a power converter that consists of two units: a transformer/rectifier 12 and an inverter 14. The transformer/rectifier 12 converts AC line power from a 3-phase supply 16 into DC power on a line 18, and the inverter 14 converts the DC power into AC current supplied to an induction furnace 20. To compensate for the inductive impedance of the furnace 20, the inverter unit 14 incorporates capacitors (not shown) which, when taken together with the furnace inductance, form a resonance loop. Varying the operating frequency in the inverter 14 alters the impedance of the resonance loop, thus controlling the power delivered to the load 20.

Figure 2:
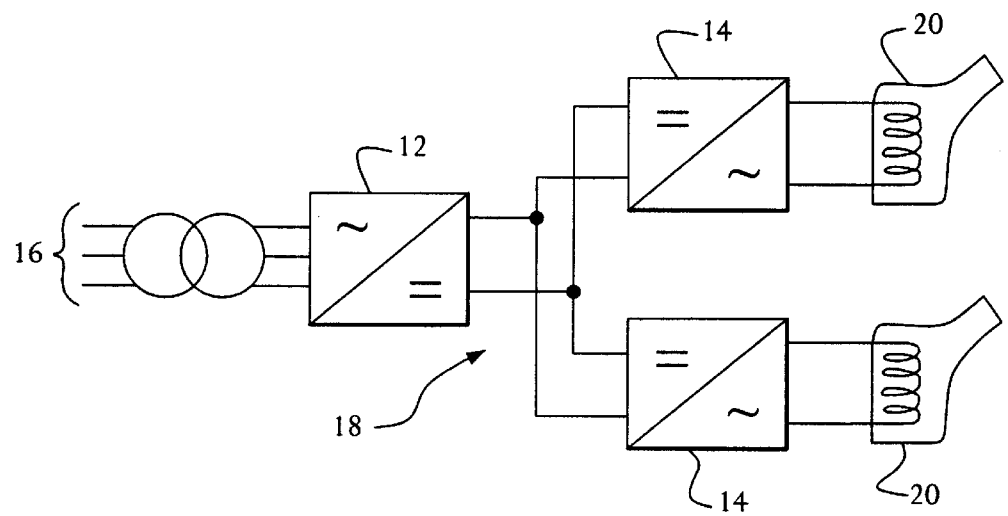
FIG. 2 is a block diagram of a previously proposed induction melting system.

As shown in FIG. 2, a dual output induction melting system similar to that disclosed in U.S. Pat. No. 5,272,719 (the entire content of which is herein imported by reference) comprises a single transformer/rectifier 12. The transformer/rectifier 12 supplies in parallel two inverters 14 through the common DC lines 18. Each of the inverters 14 supplies a separate furnace 20. Each inverter 14 is capable of supplying the full melting power to its furnace 20. The maximum power output of the transformer/rectifier 12 is sufficient to supply the full melting current to one furnace, and a lower power, for sintering or other processing or simply to maintain the temperature of a charge of molten metal, to the other furnace. The two furnaces are operated with an alternating cycle, so that one is melting metal while the other is processing or dispensing metal previously melted.

Figure 3:
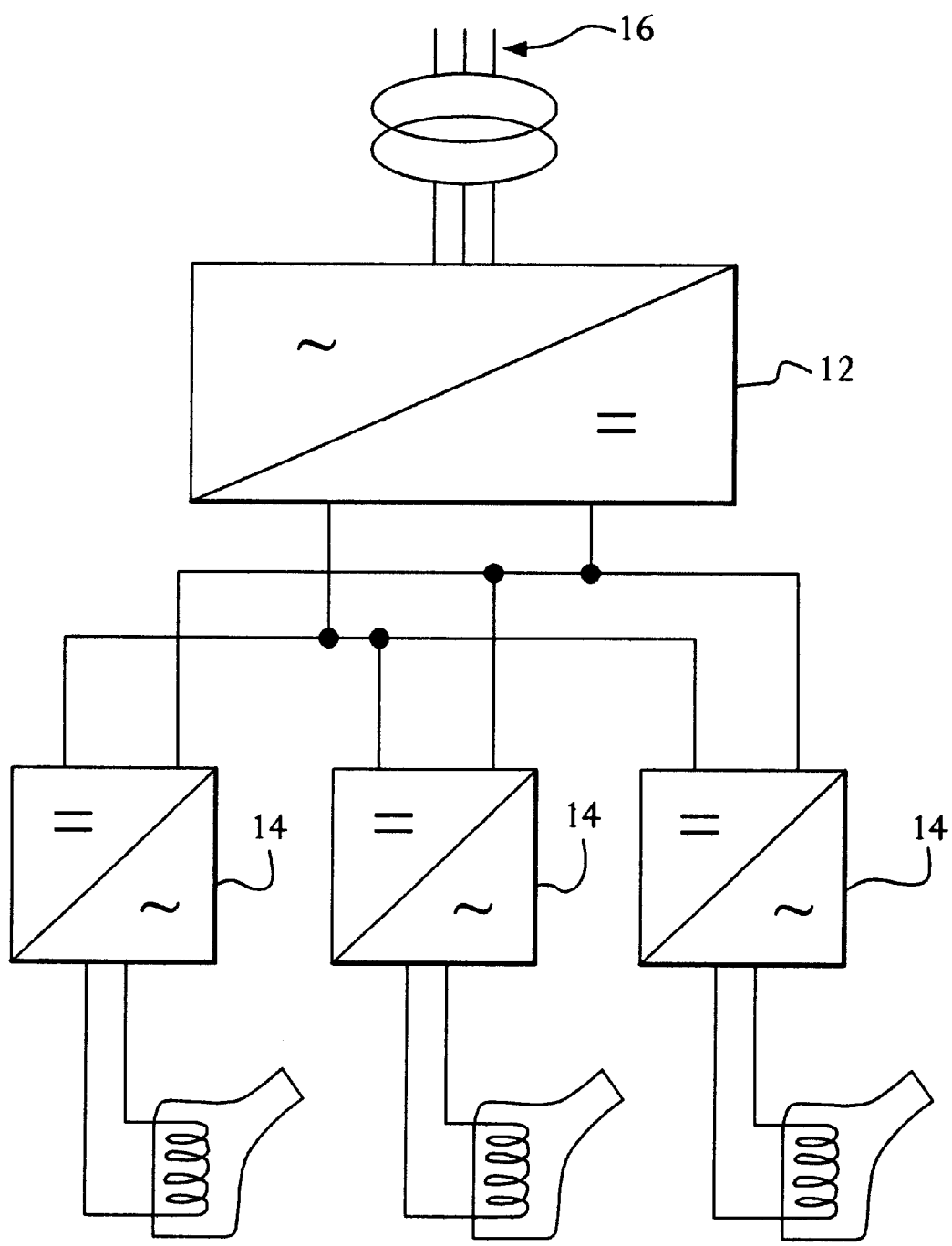
FIG. 3 is a block diagram of an induction melting system having a tri-output power conversion system.

As shown in FIG. 3, an improved induction melting system has a tri-output transformer/rectifier 12 supplying three inverters 14, each of which supplies a single furnace 20. As an example, each of the furnaces 20 is a 35-ton furnace, requiring 24 MW for 40 minutes to melt a charge of metal, and requiring 2 MW holding power to keep the molten charge hot. Thus, each of the inverters 14 has a power throughput capacity of 24 MW. The transformer/rectifier 12 has a power throughput capacity of 50 MW. By suitably staggered timing of the operating cycles of the three furnaces, one furnace can then start a melting cycle every 20 minutes. The shop may then empty one furnace by pouring for 20 minutes, while the other two furnaces are melting the next two batches. The cast shop then has a steady supply of metal, with each furnace becoming available for pouring just as the previous one is emptied. The electric power consumption is also steady, minimizing the power demand.

However, the system shown in FIG. 3 presents problems. In particular, the very large, 24 MW inverters are not entirely reliable and durable, and the failure of one of the inverters can cause operating problems, if a furnace containing 35 tons of molten or partly molten metal is abruptly deprived of heat. Such a failure also deprives the system of a third of its metal-melting capacity, and an abrupt failure may result in an unacceptable transient surge propagating back into the incoming power supply 16. A failure in one of the phases of the three-phase transformer/rectifier 12 could have similar undesirable effects.

Figure 4:
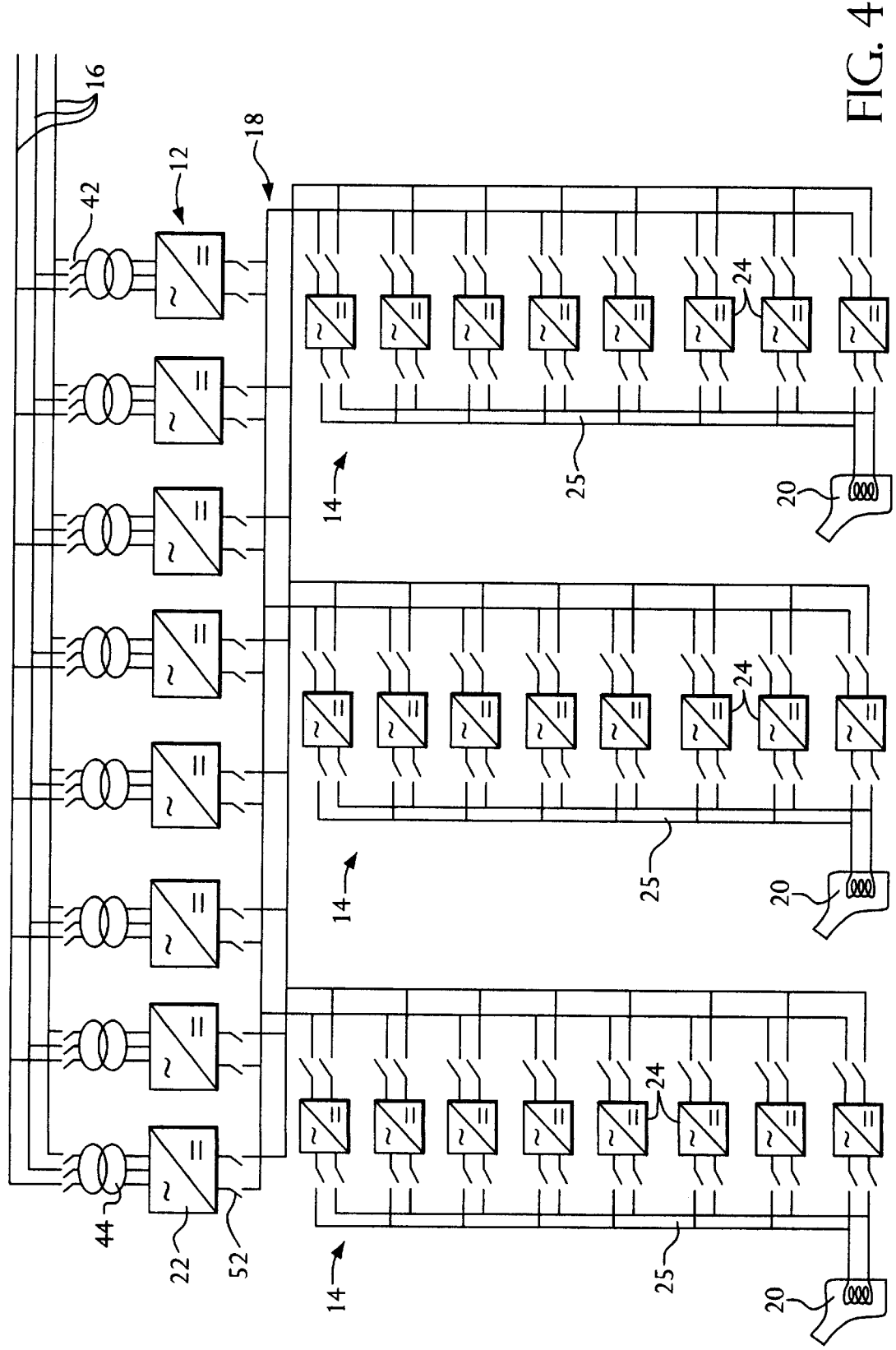
FIG. 4 is a block diagram of an induction melting system having modular transformer/rectifier and inverter units.
Figures 5, 6:
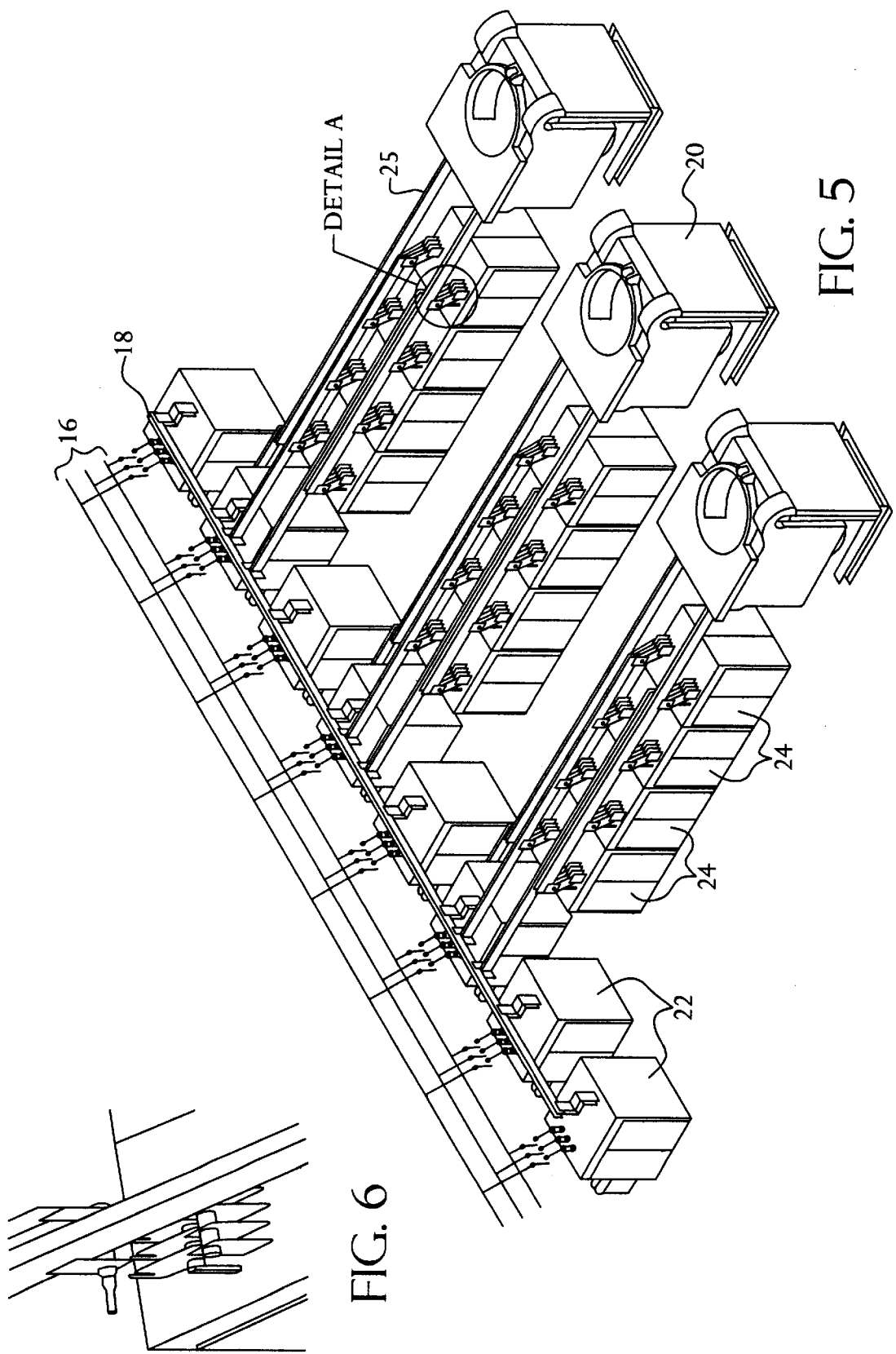
FIG. 5 is a schematic perspective view of the system of FIG. 4.
FIG. 6 is a perspective view of a detail of FIG. 5.

Referring now to FIGS. 4 to 6, in one embodiment of the present invention the single transformer/rectifier unit 12 consists of eight modules 22 arranged in parallel. Each module 22 is connected to the incoming 3-phase AC line 16, and to the DC line 18.

Each of the inverters 14 consists of eight modules 24 arranged in parallel. Each module 24 is supplied by the DC line 18, which thus forms a DC power bus connecting all eight transformer/rectifier modules 22 to all twenty-four inverter modules 24. All eight inverter modules 24 making up an inverter 14 supply, through another bus 25, the induction coil of their respective furnace 20.

As an example, a 50 megawatt three-output melting system shown in FIG. 4 consists of one transformer/rectifier unit and three inverter units. The transformer/rectifier unit 12 consists of eight identical transformer/rectifier modules 22 each rated at 6,500 kVA. Each inverter unit 14 consists of eight 3-megawatt modules 24.

Figure 7:
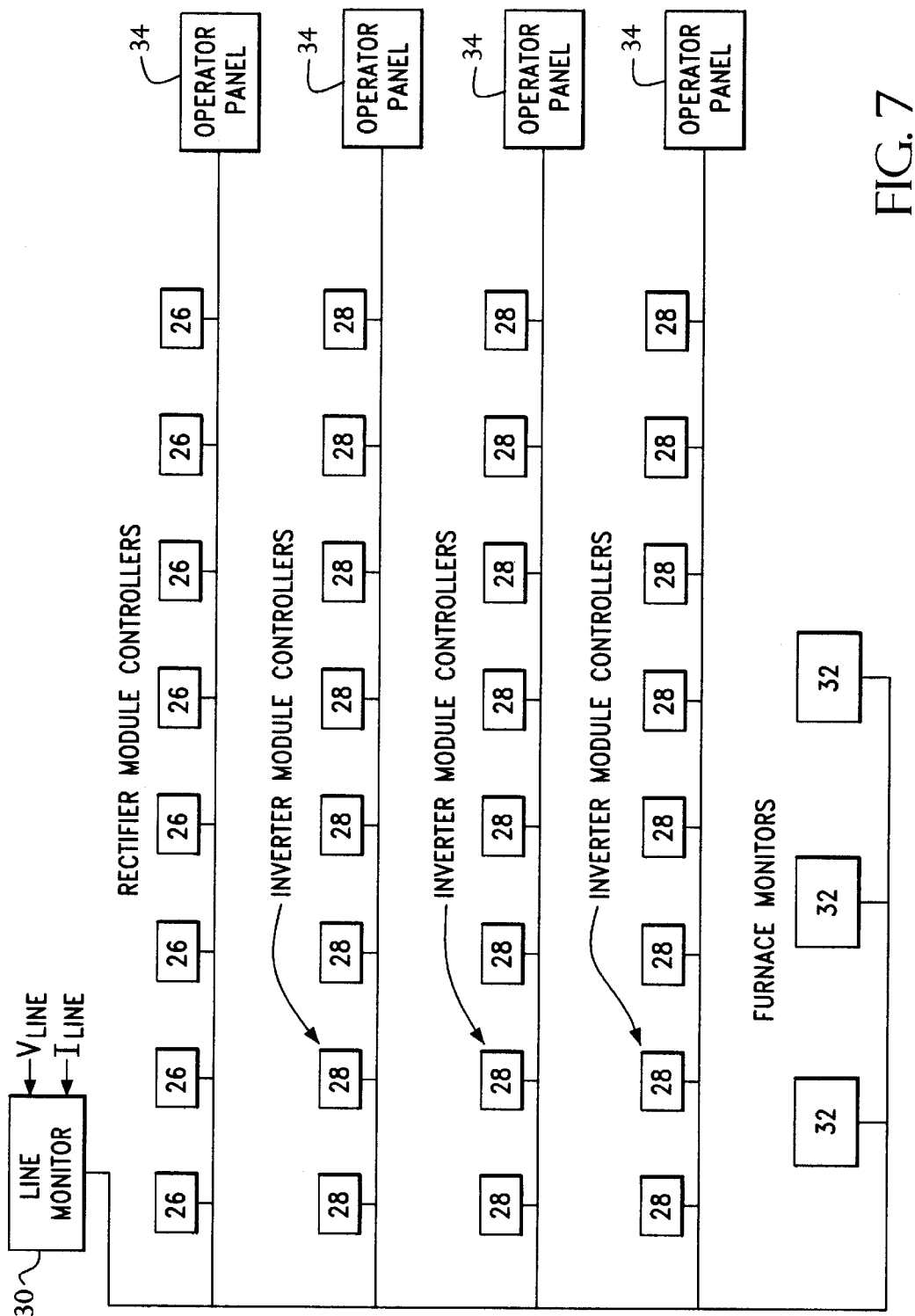
FIG. 7 is a block diagram of a control network for the system of FIG. 4.

The block diagram of the high power modular induction heating and melting system is shown in FIG. 4. The physical layout of this system is shown in FIGS. 5 and 6 and the control block diagram is shown in FIG. 7.

Each transformer/rectifier module 22 includes an autonomous electronic controller 26 and each inverter module 24 includes an autonomous electronic controller 28. All of the controllers communicate via a shared digital control network shown in FIG. 6. In addition, an input line monitor 30, furnace monitors 32, and operator interface panels 34 are connected to the control network. The task of the monitors and controllers is to assure safe operation of the entire system.

Figure 8:
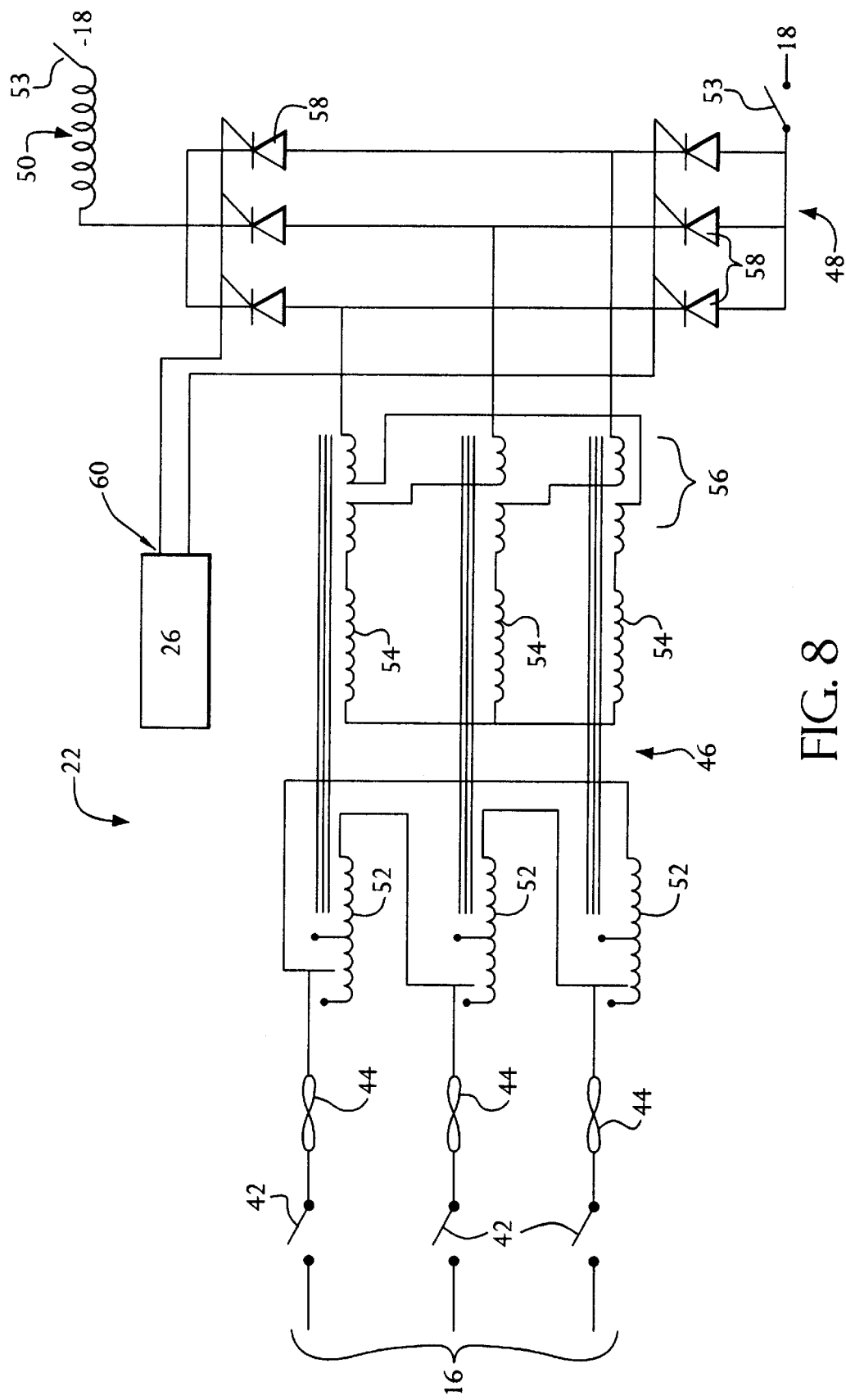
FIG. 8 is a schematic circuit diagram of a transformer/rectifier module of the system of FIG. 4.

Referring now to FIG. 8, each transformer/rectifier module 22 comprises high voltage disconnection switches 42, protection fuses 44, a transformer 46, a rectifier 48, a DC reactor 50, DC disconnection switches 53, and the controller 26.

The high voltage disconnection switches 42 serve to safely disconnect the transformer/rectifier module 22 from the incoming high voltage three-phase line 16 and allow servicing of the module. The protection fuses 44 serve to protect the transformer 46 from overload conditions. The transformer 46 serves to match the primary AC line voltage with the secondary voltage needed by the rectifier 48 to produce a stable DC supply for the system. The transformer 46 contains primary windings 52 and secondary windings 54 that can be configured to produce a desired phase shift between primary and secondary AC voltages.

Each module 22 has a different phase shift on the secondary winding 54 produced by interconnection of different sub-windings 56. By shifting the phases it is possible to minimize the distortions that the rectifier 48 injects into the power line 16. This reduction of distortions is achieved when distortions produced in one of the rectifier modules 22 are negated by distortions produced in another rectifier module 22. Therefore, the distortions are trapped inside the secondary windings and circulate among the transformer rectifier modules without reaching the high voltage supply line.

The rectifier 48 comprises a set of six silicon control rectifiers (SCRs) 58 which are activated from the rectifier controller 26 via an SCR integrated gate terminal 60. The controller 26 monitors the AC, DC, and SCR voltages as well as AC current in the secondary windings of the transformer. The controller 26 includes a digital communications interface (not shown) that allows the controller to communicate with other controllers and monitors in the system as wells as with external operator panels and supervisory computers.

The rectifier controller 26 can activate the rectifier SCRs 58 upon external command or can shut them off when an abnormal situation endangers safe operation. Only the rectifier module 22 that is under threat will be shut down, while the rest of the modules 22 can continue to operate. The system as a whole can then continue to work, although possibly at reduced output.

The controller 26 in the affected module 22 will inform other controllers of the removal from service of one transformer/rectifier module, and appropriate adjustments in the entire system can take place either automatically or at the direction of a human operator at a panel 34.

The DC reactor 50 suppresses DC ripple induced by the inverter on the DC bus 18 to minimize the injection of the inverter frequency into the AC supply line 16. The DC reactor 50 also limits the rate of change of the DC current during startup of the melting system and if the DC voltage collapses.

The controllers 26 also adjust the timing of the SCR gating to equalize power consumption among all of the transformer/rectifier modules 22. The high voltage and DC disconnection switches 42 and 53 are manually operated. They are used when one of the modules 22 has to be removed from service and disconnected from the power supply for servicing.

Figure 9:
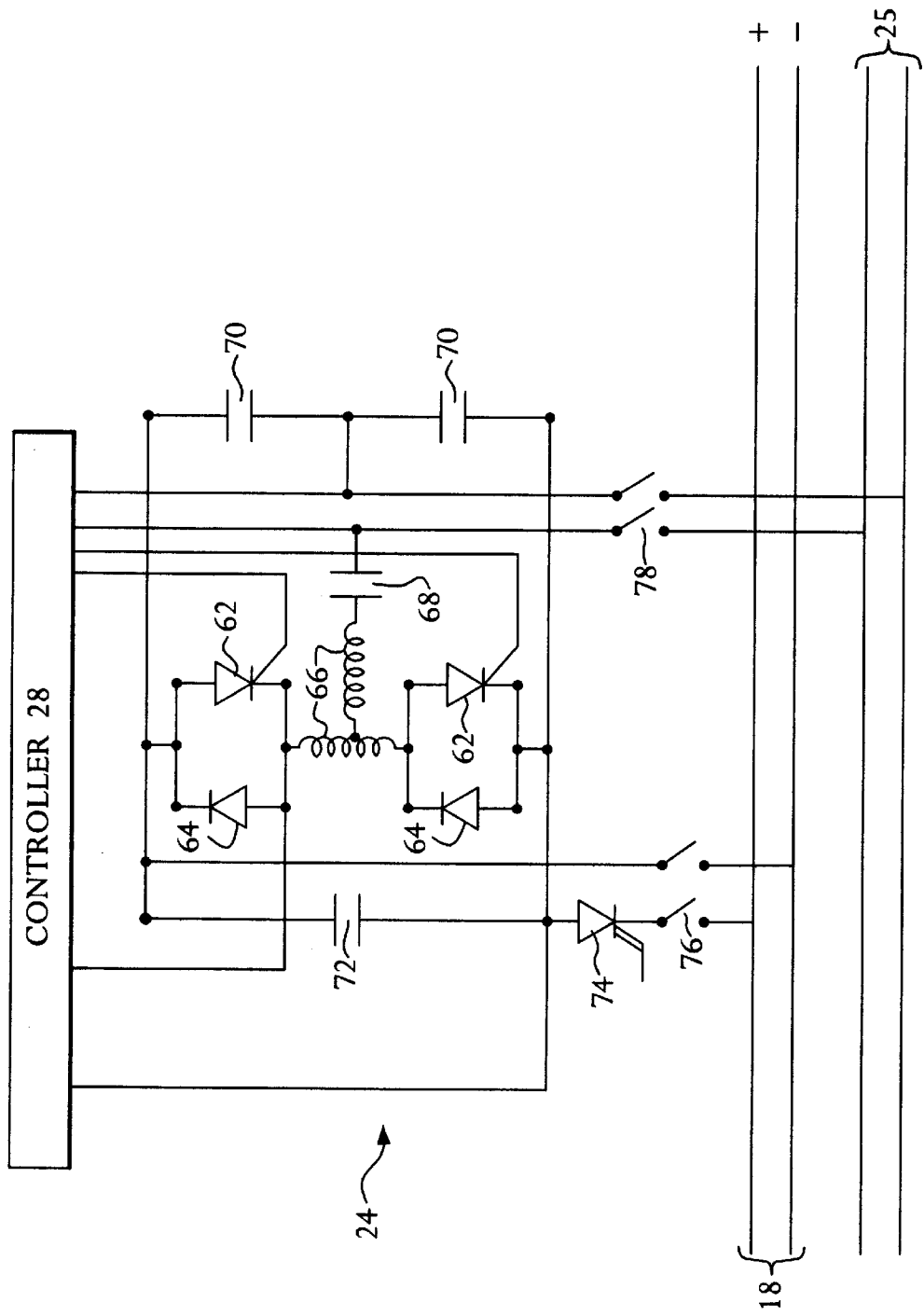
FIG. 9 is a schematic circuit diagram of inverter modules of the system of FIG. 4.

Referring now to FIG. 9, each of the inverter modules 24 includes a panel consisting of two inverter grade SCRs 62, a set of diodes 64, a set of commutation reactors 66, a set of primary-capacitors 68, a set of secondary capacitors 70, a set of filter capacitors 72, an electronic disconnection switch 74, mechanical disconnection DC switches 76, and mechanical disconnection output switches 78. The electronic disconnection switch is implemented by means of a high voltage diode, SCR, Gate Control Thyristor (GCT) or MOS Controlled Thyristor (MCT).

The inverter SCRs 62 are fired alternatively, injecting AC current into the AC bus that leads to the induction furnace 20. The furnace current is almost equally distributed among the inverter modules 24. The deviation in the furnace current is determined by the tolerances in the primary and secondary capacitance in each inverter module:

$$\frac{I_i}{I}\% = 1\frac{(1-\Delta C_i)}{N + \sum_{1}^{n-1} \Delta C_i} \cdot 100$$

where:

$I_i$ is the AC current in each inverter module;

$I = \Sigma I_i$ is the total AC current of all inverter modules in the induction furnace;

$\Delta C_i$ is the relative tolerance of the capacitors in each module;

N is the number of inverter modules in the inverter unit.

Typical tolerances of AC capacitors are in the range of 5% of average value. Therefore, inverter current in each module is in the range of $I_i = I/N(1\pm 0.05)$.

The gate pulses in all inverter modules are synchronized. The inverter controllers 28 monitor the DC and AC voltages and the currents in inverter module components. The inverter controllers 28 are connected via the network with each other and with the operator panels 34. If and when an inverter controller 28 detects abnormal conditions in an inverter module 24, it may first disconnect this module from the DC bus by opening the electronic disconnection switch 74. In the event of failure in one of the inverter SCRs 62 and a short in the inverter panel 24, the electronic switches automatically block discharge of energy from one inverter module to another. The fault is also reported via the control network to all other modules comprising the same inverter unit 14. Depending on the particular circumstances and the control algorithms in use, the other modules 24 may then continue to supply the furnace 20 with somewhat reduced melting power, lower the power to a holding level at which melting is suspended but the molten material within the furnace is prevented from solidifying, or stop their operation entirely. The reason for the fault is reported on at least the nearest operator interface terminal 34. Even if the decision is to shut down the furnace immediately, that is actually done by stopping the operation of the inverter modules 24 one at a time at slight intervals, so that the switching transients injected back into the AC supply line 16 or inflicted on other parts of the system are greatly reduced.

The manual AC and DC disconnect switches 76 and 78 allow an individual inverter module 24 to be removed from service for servicing or repair.

The control algorithm described below is based on factory preset parameters and process variables. The principle of the algorithm is to supply sufficient power to all furnaces to hold metal from freezing. The remainder of the available power is distributed among those furnaces that are engaged in melting proportionally to the amount of power that each such furnace requests. When the total power that may be drawn from an external utility supply is limited, the total maximum power available to the induction heating and melting system may have to be reduced below its nominal value. That may occur if, for example, other loads sharing the utility supply are unusually high. That is effected by imposing a demand limitation on the total maximum power available. Even in that case, however, the furnaces holding molten metal are still to be supplied with holding power.

Factory Set Parameters

N—Number of furnaces or inverter units $P_{total}$—Total maximum power available to the system $P_{max}$—Maximum power rating of each inverter $P_{hold}$—Maximum holding power for each furnace Control Variables $P_i$—Power set point for each furnace $n_{hold}$—Number of units on holding power $n_{melt}$—Number of units melting $\Sigma P_{hold}$—Total power required for holding metal $\Sigma P_{melt}$—Total power for melting D%—Demand (percent)

$P_{available}$—Total power available for melting $k_{available}$—Power availability The software monitors $P_i$—power setpoints of all units on line. If $P_i < P_{hold}$ the value $P_i$ is added to the total holding power $P_{hold}$ and the count $n_{hold}$ of number of holding units is incremented. Otherwise, the total power requested for melting $P_{melt}$ is accumulated and the count $n_{melt}$ of number of melting units is incremented. This way, each controller will know how many units are melting and how much power they need.

The available power for melting:

$$P_{available} = D\% \cdot P_{total} - \Sigma P_{hold}$$

and melting availability coefficient are computed $$k_{available} = \frac{P_{available}}{\Sigma P_{melt}}$$

If $k_{available} < 1$, the power limit is set as a portion of requested power $$P_{i\ limit} = k_{available} \cdot P_i$$

Pseudocode:

for i=1 to N

{if $P_i < P_{hold}$ {$(P_{hold} + P_i)$} else {$\Sigma P_{melt} + P_i$}

$k_{available}(D\% * P_{total} - \Sigma P_{hold}) / \Sigma P_{melt}$

If ($P_i * k_{available} > P_{hold}$ and $k_{available} < 1$) {$P_{i\ limit} = k_{available} * P_i$} else {$P_{i\ limit} = P_{hold}$}

Demand Control is fed into all control units. If one of the rectifier modules is removed for service, the power demand is reduced to (m−1)/m of its normal value where m=number of rectifier modules in the system.

Reference is made to the article "Tomorrow's Induction Melt Technologies Today" by John H. Mortimer, P.E. in Foundry Management and Technology, March 1999 pages 14–20 and May 1999 pages 41–50. The entire content of the article is herein incorporated by reference.

What is claimed is:

1. A system for melting metal and holding molten metal at a selected temperature, comprising:

an induction furnace having a maximum power consumption;

a rectifier unit arranged to receive an AC electric supply power and to output a DC electric power; and a plurality of inverter modules selectively connected in parallel to form an inverter unit, each module of said plurality of inverter modules having a selectively connectable input to a DC common connection for receiving said DC electric power from said rectifier unit and a selectively connectable output to an AC common connection for delivering an AC electric power to said induction furnace, each module of said plurality of inverter modules having an electrical capacity less than said maximum power consumption of said induction furnace;

wherein said AC electric power from said plurality of inverter modules is used to selectively melt metal or hold molten metal at a selected temperature.

2. A system according to claim 1 wherein each module of said plurality of inverter modules is capable of delivering a substantially equal amount of power to said induction furnace wherein the sum of said substantially equal amount of power over all of said plurality of inverter modules does not exceed said maximum power consumption of the induction furnace.

3. A system according to claim 1 further comprising a plurality of module controllers, each controller of said plurality of module controllers exclusively dedicated to an associated module of said plurality of inverter modules, each controller of said plurality of module controllers further comprising:

means for communication with all other of said plurality of module controllers for cooperative operation among said plurality of module controllers; and means to automatically and selectively remove from service said associated module of said plurality of inverter modules.

4. A system according to claim 3 wherein each controller of said plurality of module controllers farther comprises means to automatically and sequentially shut down said plurality of inverter modules when at least one of said plurality of inverter modules is removed from service.

5. A system according to claim 3 wherein each controller of said plurality of module controllers further comprises means to automatically supply reduced power from said inverter unit when at least one of said plurality of inverter modules is removed from service.

6. A system for melting metal and holding molten metal at a selected temperature, comprising:

a plurality of induction furnaces, each furnace of said plurality of induction furnaces having a maximum power consumption, and each furnace of said plurality of induction furnaces arranged to be supplied with AC electric power from a respective one of a plurality of AC connections;

a rectifier unit arranged to output a DC electric power to a DC common connection; and a plurality of inverter units equal in number to said plurality of induction furnaces, each inverter unit of said plurality of inverter units arranged to deliver AC electric power to a respective one of said plurality of AC connections for delivering the AC electric power to one of said plurality of induction furnaces;

each inverter unit of said plurality of inverter units further comprising a plurality of inverter modules selectively connected in parallel, each inverter module having a selectively connectable input to said DC common connection for receiving said DC electric power and each inverter module having a selectively connectable output to the one of said plurality of AC connections that is respective to the inverter unit comprising such inverter module;

wherein said AC electric power from each inverter unit of said plurality of inverter units is used to selectively melt metal or hold molten metal at a selected temperature in the respective induction furnace.

7. A system according to claim 6 wherein said DC electric power is less than the sum of said maximum power consumption of each furnace for all of said plurality of induction furnaces.

8. A system according to claim 7, wherein each furnace of said plurality of induction furnaces has a furnace maximum holding power and said DC electric power exceeds the sum of said furnace maximum holding power of each furnace for all of said plurality of induction furnaces.

9. A system according to claim 8, further comprising a controller operatively connected to each inverter unit of said plurality of inverter units, said controller further comprising:

means for inputting a power set point, $P_i$, for each furnace of said plurality of induction furnaces; and means for reducing the power set point, $P_i$, for each furnace of said plurality of induction furnaces for which said power set point, $P_i$, for each furnace exceeds said furnace maximum holding power, if the sum of said power set point, $P_i$, for each furnace over all of said plurality of induction furnaces is greater than said DC power.

10. A system according to claim 9 wherein said controller further comprises:

means for determining a total available power to the system from the product of a percentage of demand limitation, D%, and a total maximum power, $P_{total}$, available to the system;

means for determining a total power required for holding, $\Sigma P_{hold}$, by summing the power set point, $P_i$, for each furnace of said plurality of induction furnaces having said power set point, $P_i$, less than or equal to said furnace maximum holding power;

means for determining a total power required for melting, $\Sigma P_{melt}$, by summing the power set point, $P_i$, for each furnace of said plurality of induction furnaces having said power set point, $P_i$, greater than said furnace maximum holding power;

means for determining a total power available for melting, $P_{available}$, from the equation:

$$P_{available}=[D\% \bullet P_{total}]-\Sigma P_{hold};$$

means for determining a power availability coefficient, $k_{available}$, from the equation:

$$k_{available}=[P_{available}]/[\Sigma P_{melt}]; \text{ and}$$

means for adjusting said power set point, $P_i$, for each furnace of said plurality of induction furnaces for which said power set point, $P_i$, is greater than said furnace maximum holding power to a value substantially equal to the product of said power availability coefficient, $k_{available}$, and said power set point, $P_i$, if said power availability coefficient, $k_{available}$, is less than unity.

11. A system according to claim 6, wherein said rectifier unit further comprises a plurality of rectifier modules selectively connected together to a selectively connectable input for receiving said AC electric supply power and a selectively connectable output to said DC common connection for supplying said DC electric power to said plurality of inverter units.

12. A system for melting metal and holding molten metal at a selected temperature, comprising:

a plurality of induction furnaces, each furnace of said plurality of induction furnaces having a maximum power consumption;

a plurality of rectifier modules selectively connected together to form a rectifier unit, each module of said plurality of rectifier modules having a selectively connectable input to a multi-phase supply of AC power and a selectively connectable output to a DC common connection to supply a DC electric power, each module of said plurality of rectifier modules further comprising:

means for transforming said multi-phase supply of AC power, said means for transforming selectively phase shifting said multi-phase supply of AC power to provide a selective phase-shifted output; and means for rectifying said selective phase-shifted output; and a plurality of inverter units, equal in number to said plurality of induction furnaces, each inverter unit of said plurality of inverter units dedicatedly delivering an AC electric power to a respective furnace of said plurality of induction furnaces, and each inverter unit of said plurality of inverter units further comprising a plurality of inverter modules selectively connected in parallel, each module of said plurality of inverter modules having a selectively connectable input to a DC common connection for receiving said DC electric power and a selectively connectable output to an AC common connection for delivering an AC electric power to the respective furnace of said plurality of induction furnaces;

wherein said AC electric power from each inverter unit of said plurality of inverter units is used to selectively melt metal or hold molten metal at a selected temperature in the respective dedicated furnace of said plurality of induction furnaces.

13. A system according to claim 12 further comprising a plurality of rectifier module controllers, each controller of said plurality of rectifier module controllers exclusively associated with an associated module of said plurality of rectifier modules, each controller of said plurality of rectifier module controllers further comprising:

means for communication with all other of said plurality of rectifier module controllers for cooperative operation among said plurality of rectifier module controllers; and means to automatically and selectively remove from service said associated module of said plurality of rectifier modules.

14. A system according to claim 13 wherein each controller of said plurality of module controllers further comprises means to automatically and sequentially shut down said plurality of rectifier modules when at least one of said plurality of rectifier modules is removed from service.

15. A system according to claim 13 wherein each controller of said plurality of module controllers further comprises means to automatically supply reduced power from said plurality of rectifier modules when at least one of said plurality of rectifier modules is removed from service.

16. A system for melting metal and holding molten metal at a selected temperature, comprising:

a plurality of induction furnaces, each furnace of said plurality of induction furnaces having a furnace maximum holding power to hold a substantially full charge of metal in the molten state at a pre-selected temperature and a maximum power consumption;

a rectifier unit outputting a magnitude of DC electric power wherein said magnitude of DC electric power is less than the sum of the maximum power consumption for each furnace for all of said plurality of induction furnaces, and said magnitude of DC electric power exceeds the sum of said furnace maximum holding power for each furnace for all of said plurality of induction furnaces;

a plurality of inverter units, equal in number to said plurality of induction furnaces, each inverter unit of said plurality of inverter units dedicatedly delivering an AC electric power to one of said plurality of induction furnaces, and each inverter unit of said plurality of inverter units further comprising a plurality of inverter modules selectively connected in parallel, each module of said plurality of inverter modules having a selectively connectable input to a DC common connection for receiving said DC electric power and a selectively connectable output to an AC common connection for delivering an AC electric power to one of said plurality of induction furnaces; and a control means operatively connected to each inverter unit of said plurality of inverter units, said control means further comprising:

means for inputting a power set point, $P_i$, for each furnace of said plurality of induction furnaces;

means for reducing the power set point, $P_i$, for each furnace of said plurality of induction furnaces for which said power set point, $P_i$, exceeds said furnace maximum holding power, if the sum of said power set point, $P_i$, for each furnace for all of said plurality of induction furnaces is greater said than said magnitude of DC power;

means for determining a total available power to the system from the product of a percentage of demand limitation, D%, and a total maximum power, $P_{total}$, available to the system;

means for determining a total power required for holding, $\Sigma P_{hold}$, by summing the power set point, $P_i$, for each furnace of said plurality of induction furnaces having said power set point, $P_i$, less than or equal to said furnace maximum holding power;

means for determining a total power required for melting, $\Sigma P_{melt}$, by summing the power set point, $P_i$, for each furnace of said plurality of induction furnaces having said power set point, $P_i$, greater than said furnace maximum holding power;

means for determining a total power available for melting, $P_{available}$, from the equation:

$$P_{available} = [D\% \bullet P_{total}] - \Sigma P_{hold};$$

means for determining a power availability coefficient, $k_{available}$, from the equation:

$$k_{available}=[P_{available}]/[\Sigma P_{melt}]; \text{ and}$$

means for adjusting said power set point, $P_i$, for each furnace of said plurality of induction furnaces for which said power set point, $P_i$, is greater than said furnace maximum holding power to a value substantially equal to the product of said power availability coefficient, $k_{available}$, and said power set point, $P_i$, if said power availability coefficient, $k_{available}$, is less than unity.

17. A system according to claim 16 wherein said rectifier unit further comprises a plurality of rectifier modules selectively connected together to a selectively connectable input for receiving said AC electric supply power and a selectively connectable output to a common DC connection for supplying said magnitude of DC electric power to said plurality of inverter modules.

18. A method for selectively melting metal and holding molten metal at a selected temperature in a plurality of induction furnaces, each furnace of said plurality of induction furnaces having a furnace maximum holding power to hold a substantially fall charge of metal in the molten state and a furnace maximum power consumption, the method comprising the steps of:

supplying an AC electric power to said plurality of induction furnaces from a plurality of inverter units equal in number to said plurality of induction furnaces, wherein each inverter unit of said plurality of inverter units dedicatedly supplies said AC electric power to a respective furnace of said plurality of induction furnaces, and each inverter of said plurality of inverter units further comprises a plurality of inverter modules;

supplying a magnitude of DC electric power from at least one rectifier module receiving a magnitude of AC electric supply power to all of said plurality of inverter units, said magnitude of DC electric power equal to less than the sum of the furnace maximum power consumption for each furnace for all of said plurality of induction furnaces, and greater than or equal to the sum of said furnace maximum holding power for each furnace of all of said plurality of induction furnaces;

establishing a power set point for each furnace of said plurality of induction furnaces;

reducing said power set point for each furnace of said plurality of induction furnaces for which the power set point exceeds said furnace maximum holding power if the summation of said power set point for each furnace for all of said plurality of induction furnaces is greater than said magnitude of DC electric power; and sharing a magnitude of available melting power among each furnace of said plurality of induction furnaces having a power set point greater than said furnace maximum holding power wherein said magnitude of available melting power is determined by the difference between said magnitude of AC electric supply power and a total power required for holding determined by summing the power set point for each furnace of said plurality of induction furnaces wherein said power set point is less than or equal to said furnace maximum holding power for each furnace of said plurality of induction furnaces.

19. A method for selectively melting metal and holding molten metal in a plurality of induction furnaces, each furnace of said plurality of induction furnaces having a furnace maximum holding power to hold a substantially full charge of metal in the molten state and a furnace maximum power consumption to melt a substantially full charge of metal, comprising the steps of:

supplying an AC electric power to said plurality of induction furnaces from a plurality of inverter units equal in number to said plurality of induction furnaces, wherein each inverter unit of said plurality of inverter units dedicatedly supplies said AC electric power to a respective furnace of said plurality of induction furnaces, and each inverter of said plurality of inverter units further comprises a plurality of inverter modules;

supplying a magnitude of DC electric power from at least one rectifier module receiving a magnitude of AC electric supply power to all of said plurality of inverter units, said magnitude of DC electric power equal to less than the sum of the furnace maximum power consumption for each furnace for all of said plurality of induction furnaces, and greater than or equal to the sum of said furnace maximum holding power for each furnace of all of said plurality of induction furnaces;

establishing a power set point, $P_i$, for each furnace of said plurality of induction furnaces;

reducing said power set point, $P_i$, for each furnace of said plurality of induction furnaces for which the power set point, $P_i$, exceeds said furnace maximum holding power if the summation of said power set point for each furnace for all of said plurality of induction furnaces is greater than said magnitude of DC electric power;

inputting a percentage of demand limitation, D%, and a total maximum power, $P_{total}$, available to the system;

determining a total power required for holding, $\Sigma P_{hold}$, by summing the power set point, $P_i$, for each furnace of said plurality of induction furnaces having said power set point, $P_i$, less than or equal to said furnace maximum holding power;

determining a total power required for melting, $\Sigma P_{melt}$, by summing the power set point, $P_i$, for each furnace of said plurality of induction furnaces having said power set point, $P_i$, greater than said furnace maximum holding;

determining a total power available for melting, $P_{available}$, from the equation:

$$P_{available}=[D\% \bullet P_{total}]-\Sigma P_{hold};$$

determining a power availability coefficient, $k_{available}$, from the equation:

$$k_{available}=[P_{available}]/[\Sigma P_{melt}]; \text{ and}$$

adjusting said power set point, $P_i$, for each furnace of said plurality of induction furnaces for which said power set point, $P_i$, is greater than said furnace maximum holding power to a value substantially equal to the product of said power availability coefficient, $k_{available}$, and said power set point, $P_i$, if said power availability coefficient, $k_{available}$, is less than unity.

* * * * *